(12) United States Patent
Cazier et al.

(10) Patent No.: US 7,924,328 B2
(45) Date of Patent: Apr. 12, 2011

(54) APPLYING VISUAL EFFECT TO IMAGE DATA BASED ON AUDIO DATA

(75) Inventors: Robert P. Cazier, Fort Collins, CO (US); Murray Dean Craig, Johnstown, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1082 days.

(21) Appl. No.: 11/627,338

(22) Filed: Jan. 25, 2007

(65) Prior Publication Data
US 2008/0183751 A1  Jul. 31, 2008

(51) Int. Cl.
*H04N 5/262* (2006.01)
(52) U.S. Cl. ........................................................ 348/239
(58) Field of Classification Search ................. 348/239, 348/207.99; 352/11, 12
See application file for complete search history.

(56) References Cited

U.S. PATENT DOCUMENTS

| 7,505,051 | B2 * | 3/2009 | Wang ............................. 345/660 |
| 7,593,045 | B2 * | 9/2009 | Ikeda et al. ................... 348/239 |
| 2004/0054542 | A1 * | 3/2004 | Foote et al. .................... 704/500 |
| 2006/0152678 | A1 * | 7/2006 | Hung et al. ...................... 352/12 |

FOREIGN PATENT DOCUMENTS

| JP | 2001298688 | 10/2001 |
| JP | 2003-324682 A2 | 11/2003 |
| JP | 2006-094536 A | 4/2006 |
| JP | 2006197442 | 7/2006 |
| JP | 2006-203809 A | 8/2006 |

OTHER PUBLICATIONS

Japanese Patent Application No. 2008-013509; Office Action mailed Oct. 27, 2009.
JP Office Action for JP Publication No. 2008-013509. Dated Dec. 17, 2010. pp. 3.
JP Office Action for JP Publication No. 2008-013509. Dated May 18, 2010, pp. 3.

* cited by examiner

*Primary Examiner* — Tuan Ho

(57) ABSTRACT

Audio data is accessed. A visual effect is applied to image data based on the audio data. The image data to which the visual effect has been applied based on the audio data is displayed.

19 Claims, 3 Drawing Sheets

```
DIGITAL CAMERA DEVICE                                          500

┌─────────────┐      ┌─────────┐      ┌─────────────┐
   │ DIGITAL     │      │         │      │ AUDIO DATA  │
   │ PICTURE     │      │ DISPLAY │      │ RECORDING   │
   │ CAPTURING   │      │   504   │      │ MECHANISM   │
   │ MECHANISM   │      │         │      │    506      │
   │    502      │      │         │      │             │
   └─────────────┘      └─────────┘      └─────────────┘

┌─────────┐         ┌───────────────────┐
          │  LOGIC  │         │ STORAGE MECHANISM │
          │   508   │         │        510        │
          └─────────┘         └───────────────────┘
```

APPLYING VISUAL EFFECT TO IMAGE DATA BASED ON AUDIO DATA

BACKGROUND

Digital cameras are devices that permit users to take photos as digital image data, as opposed to traditional film-based cameras that permit users to take photos on film that must then be developed. Digital cameras have become increasingly popular, and more digital cameras are now used than traditional film-based cameras. One advantage of digital cameras is that various visual effects, such as textures, borders, and other types of artistic effects, can be applied to the image data, even within the cameras themselves. Users can thus customize photos in ways that are unavailable within film-based cameras.

However, such visual effects can typically only be applied in predetermined ways. For example, a user may have a limited number of different choices in which he or she can apply a given visual effect to image data. The number of different choices may be limited by the amount of memory available within the camera, for instance. These different choices may be quickly exhausted by the user. As such, applying the virtual effects may become stale to the user, such that the user does not use the visual effects capability of a digital camera once their newness has worn off.

DETAILED DESCRIPTION OF THE DRAWINGS

Figure 1:
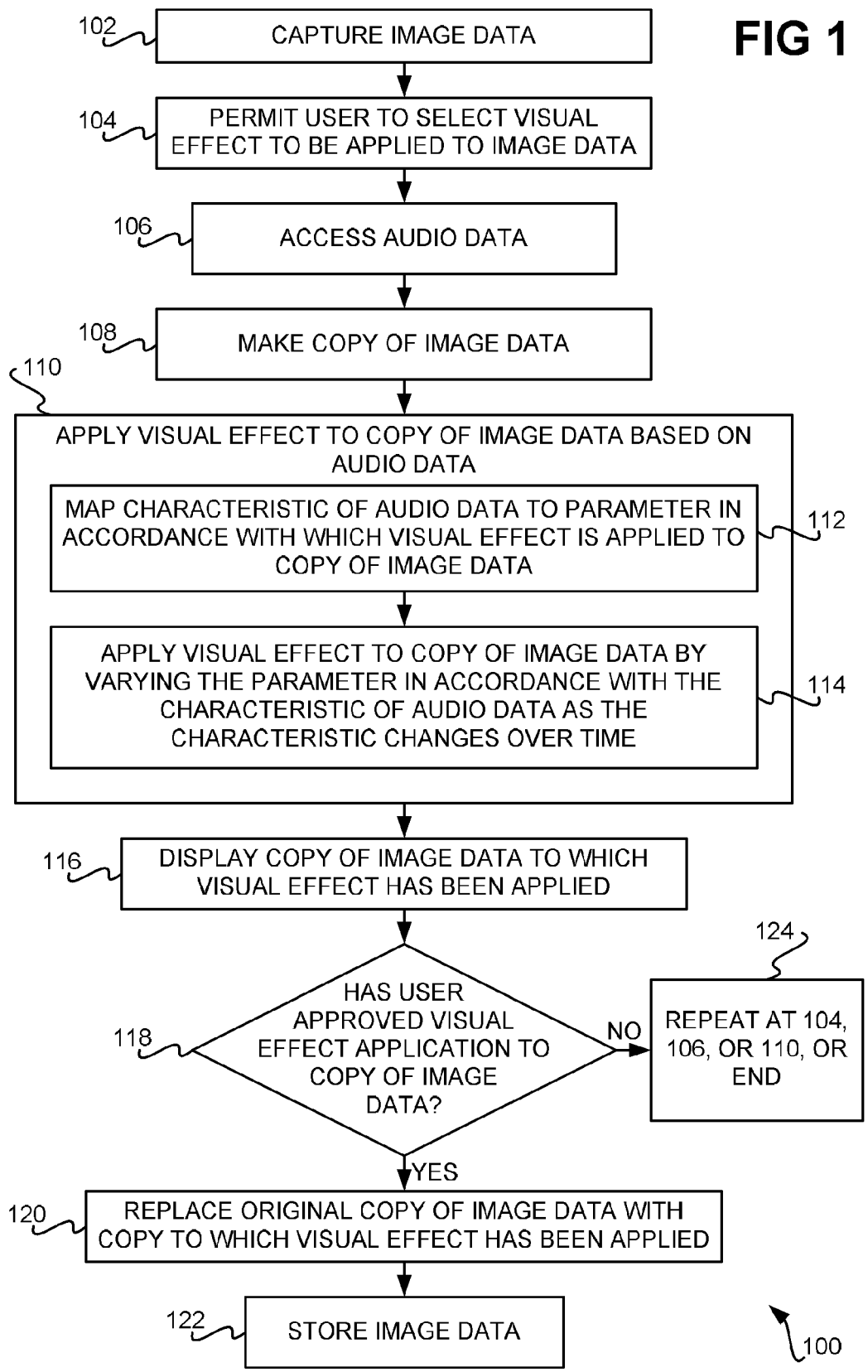
FIG. 1 is a flowchart of a method for applying a visual effect to image data based on audio data, according to an embodiment of the invention.

FIG. 1 shows a method 100 for applying a visual effect to image data based on audio data, according to an embodiment of the invention. The method 100 is described in relation to performance within a digital camera device, such as a digital camera, but may also be performed by a different type of computing device, such as a desktop or a laptop computer. Furthermore, the various steps, parts, and/or acts of FIG. 1 may not be needed for all embodiments of the method 100. The method 100 of FIG. 1 is first described in detail as to general operation thereof, and then some more concrete examples of the performance of the method 100 are presented.

Image data is captured (102), or otherwise acquired. For instance, in relation to a digital camera device, the image data may be captured by a digital picture capturing mechanism of the digital camera device, as is conventional. The image data may alternatively be acquired or generated in another manner. For example, a user may access a previously stored image, which may or may not have been captured with a digital camera device.

The user is permitted to select a visual effect to be applied to the image data (104). Examples of such visual effects include textures, digital signatures, borders, coloring, and other types of artistic effects. The types of visual effects that may be applied to the image data are not limited by embodiments of the invention. Such visual effects are applied to the image data in manners known to those of ordinary skill within the art, where such application is varied based on audio data, as will be described.

A texture is a visual effect that instills a faux texture to the image data. For example, a predetermined shape may be visually impressed upon the image data in a random or a regular pattern. A digital signature, or watermark, is a visual effect that modifies one or more parts of the image data in accordance with data that is particular to a user. For example, the colors of a corner of the image data may be modified based on data, such as audio data, that is particular to a user.

A border is a visual effect in which a border is added to one or more sides of the image data. Different types of borders include soft edge borders, inset borders, torn edge borders, burned edge borders, spatter borders, oval borders, circular borders, rectangular borders, rounded borders, and square borders, among other types of borders. A soft edge border is a soft, vignetted frame around the image data. An inset border extends the image beyond an inset frame. A torn edge border includes random tears around the edges of the image data for an uneven border effect. A burned edge border includes darkened areas around the edges of the image data that appear burned.

A spatter border is an edge that appears to dissolve, like spray. An oval border may be an oval matte border having beveled edges, while a circular border may be a circular matte border having beveled edges. Likewise, a rectangular border may be a rectangular matte border with beveled edges. A rounded border is similar to a rectangular border, but has rounded corners. A square border may be a square matte border with beveled edges.

Examples of coloring visual effects include black-and-white, sepia, black-and-white tint, and color tint coloring visual effects. A black-and-white coloring converts color image data to black and white, whereas a sepia coloring converts image data to a brownish tone to appear old-fashioned. A black-and-white tint coloring applies different types of color tones to a black-and-white version of the image data, whereas a color tint coloring adds an extra layer of color to the image data.

Examples of artistic effects include ink dots, cartooning, watercolor, center focus, posterization, retro, romantic, antique, slimming, enhanced sky color, enhanced ground color, kaleidoscope, and solarization, among other types of artistic effects. Ink dots are an artistic effect in which dots are used to simulate the artistic technique of pointillism. Cartooning is an artistic effect that simulates a highly graphical comic book image. Watercolor is an artistic effect that simulates a watercolor painting. Center focus is an artistic effect that generates a feathered blur radiating from a sharp image center to blurred image edges. Posterization is an artistic effect that creates a high-contrast, flat-toned effect. A retro artistic effect may create a limited number of colors, high-contrast look. A romantic artistic effect may add a diffuse, bright ethereal glow to the image, where an antique artistic effect may add an aged, scratched look to the image.

A slimming artistic effect may compress centered subjects within the image data so that they appear slimmer. An enhanced sky color artistic effect may enhance portions of the sky within the image with a feathered color that fades from top to bottom. An enhanced ground color artistic effect may enhance landscapes with a feathered color that fades from bottom to top. A kaleidoscope artistic effect may mirror the image data in four directions. Solarization is an artistic effect that can create a partial reversal of tones within the image data to emphasize outlines of objects within the image data.

Audio data is then accessed (106). The audio data may be accessed by recording the audio data using a microphone or other audio data recording mechanism of a digital camera or other type of device, for instance. The audio data may alternatively be accessed by retrieving prerecorded audio data. This audio data may be stored externally from the image data, or with the image data as metadata, for instance. The user may also be permitted to select a portion of the audio data. For example, a user interface may be displayed, such as a slider, such that the user can denote the start and stop points of the portion of the audio. The selected visual effect is applied based on the audio data as a whole, or based on the portion of the audio data that has been selected.

A copy of the image data may be made (108). For instance, a copy of the image data may be made so that the visual effect is applied to this copy of the image data, as opposed to the original image data. This permits the user to reject changes made to the image data via the visual effect application, such that the original image data is retained. That is, the user can "go back" to the original image data if he or she does not desire to keep the visual effect application to the image data.

Thereafter, the selected visual effect is applied to the copy of the image data, based on the audio data (110). Stated another way, the visual effect is applied to the copy of the image data in a way that utilizes the audio data, such that the audio data itself governs how the visual effect is applied to the copy of the image data. For example, some types of visual effects, such as textures, may normally be applied to image data by using a sequence of random numbers that governs where and to what extent a given predetermined shape is imprinted on the image data to form a texture. In such an example, the audio data may effectively replace the sequence of random numbers. This by itself is advantageous, insofar as random number generation is in actuality a difficult process and not truly random, and insofar as digital camera devices may not have the requisite random number generation capabilities.

A visual effect can be applied to a copy of the image data based on the audio data (or a selected portion thereof) in one embodiment by performing parts 112 and 114 of the method 100. First, a characteristic of the audio data is mapped to a parameter in accordance with which the visual effect is applied to the copy of the image data (112). Second, the visual effect is applied to the copy of the image data by varying the parameter in accordance with the characteristic of the audio data, as this characteristic changes over the time span of the audio data (114).

Examples of audio data characteristics include tone, volume, bandwidth, and pitch. For instance, the audio data may be five seconds in length. Over the course of these five seconds, the characteristics of the audio data change. The tone of the audio data may change, the volume of the audio data may change, and the pitch of the audio data may change, as can be appreciated by those of ordinary skill within the art.

Examples of parameters in accordance with which the visual effect is applied to the copy of the image data include the degree to which the visual effect is applied to the image data, as well as color, contrast, and brightness. For instance, a texture effect may be lightly applied, or it may be heavily applied. Light application of a texture may yield image data in which the texture is just slightly visible or discernible. Heavy application of a texture may yield image data in which the texture may be more visible or discernible than the original image data itself.

The color of the image data may be modified, such as by making the color more or less vivid, for instance, or by instilling a particularly colored tone to the image data, such as red, green, violet, and so on. The contrast of the image data may likewise be modified, by increasing or decreasing the contrast. Similarly, the brightness of the image data may be modified. For instance, the brightness of the image data may be increased or decreased. Modifying the color, contrast, and/or brightness of the image data may be achieved by modifying these parameters similarly as to the image data as a whole, or by modifying these parameters differently as to different portions of the image data.

Mapping the characteristic of the audio data to the parameter in accordance with which the visual effect is applied to the copy of the image data can include determining the upper and lower limits of this characteristic as present within the audio data. For example, the volume of the audio data may vary from X decibels (dB) to Y dB. The range from X to Y may then be mapped to, for instance, the degree to which the visual effect is applied to the image data. Thus, at a point in the audio data at which the volume is X dB, the visual effect may be lightly applied to the image data. By comparison, at a point at which the volume is Y dB, the visual effect may be heavily applied to the image data. It is noted that this mapping may be modified by the user via an appropriate user interface, in one embodiment of the invention.

Applying the visual effect to the copy of the image data based on the audio data can then include stepping through the time span of the audio data, and using the value of the characteristic of the audio data at each point within the time span to determine the value of the parameter in question. In the example of the previous paragraph, for instance, texture may be applied to various locations within the image. At each location, the degree to which a predetermined shape is applied to the image to texture the location is determined by the volume of the audio data at a corresponding point within the time span of the audio data. Thus, at locations of the image data that correspond to relatively quiet points within the audio data, the shape is imprinted within the image data lightly. By comparison, at locations of the image data that correspond to relatively loud points within the audio data, the shape is imprinted within the image data heavily.

The copy of the image data to which the visual effect has been applied based on the audio data is then displayed (116), such as on a display of the digital camera device. The copy of the image data may be displayed in substantially real time as the user selects the portion of the audio data on which basis the visual effect is applied, in part 106. Likewise, the copy of the image data may be displayed in substantially real time as the visual effect is applied to the image data based on the audio data in part 110. Thus, as the user selects different portions of the audio data, and/or different visual effects, the visual effect may be applied to the copy of the image data, and this copy of the image data be displayed, in substantially real time.

The user may be provided with an opportunity to approve the visual effect that has been applied to the copy of the image data, by virtue of an appropriate user interface, as can be appreciated by those of ordinary skill within the art. If the user has approved the application of the visual effect (118), then the original copy of the image data may be replaced with the copy as to which the visual effect has been applied based on the audio data (120). Thereafter, the image data may be stored (122), such as internally within the digital camera device, or on a computing device to which the digital camera device is communicatively coupled.

If the user does not approve the application of the visual effect to the copy of the image data (118), one of at least four different actions can be performed (124). First, the method 100 may be repeated at part 104, so that the user can select a different visual effect to be applied. Second, the method 100 may be repeated at part 106, so that the user can select different audio data, or a different portion of the same audio data, on which basis the visual effect is applied. Third, the method 100 may be repeated at 110, especially in the case where the user is able to modify how the characteristic of the audio data is mapped to a parameter in accordance with which the visual effect is applied. Fourth, the method 100 may simply end, where the image data remains unmodified by application of any visual effect.

Figure 2:
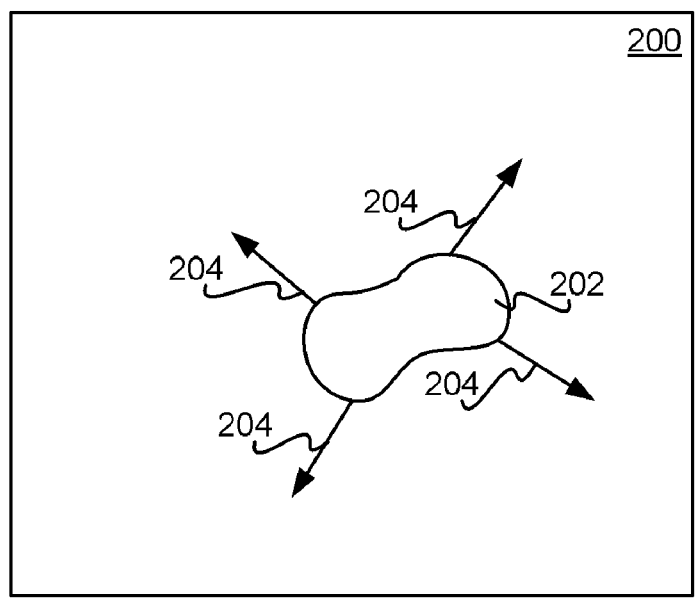
FIGS. 2, 3, and 4 are rudimentary diagrams of image data in relation to which visual effects can be applied by using audio data, according to varying embodiments of the invention.

Different examples by which a visual effect can be applied to image data based on audio data are now presented. Embodiments of the invention are not limited to these examples, however. FIG. 2 shows image data 200 in relation to which a predetermined shape 202 is applied thereto to texture the image data 200, according to an embodiment of the invention. The locations where the predetermined shape 202 is moved within the image data 200, as indicated by arrows 204, may be controlled by a first characteristic of the audio data in question, such as how the tone of the audio data increases or decreases. How heavily the predetermined shape 202 is imprinted on the image data 200 may be controlled by a second characteristic of the audio data, such as the volume of the audio data.

As another example of applying a texture to image data based on audio data, the user may be requested to sing or speak, and the user's voice recorded as the audio data. The tone, volume, and bandwidth (i.e., the contained frequencies), as well as white noise analysis (i.e., offset from complete quiet) of the audio data may be analyzed. These characteristics of the audio data may be combined in some way to yield a single characteristic that affects how a predetermined shape is applied to the image data. For instance, as the user sings or speaks, the shape may be applied in combinatorial fashion to generate a texture of the image data.

Figure 3:
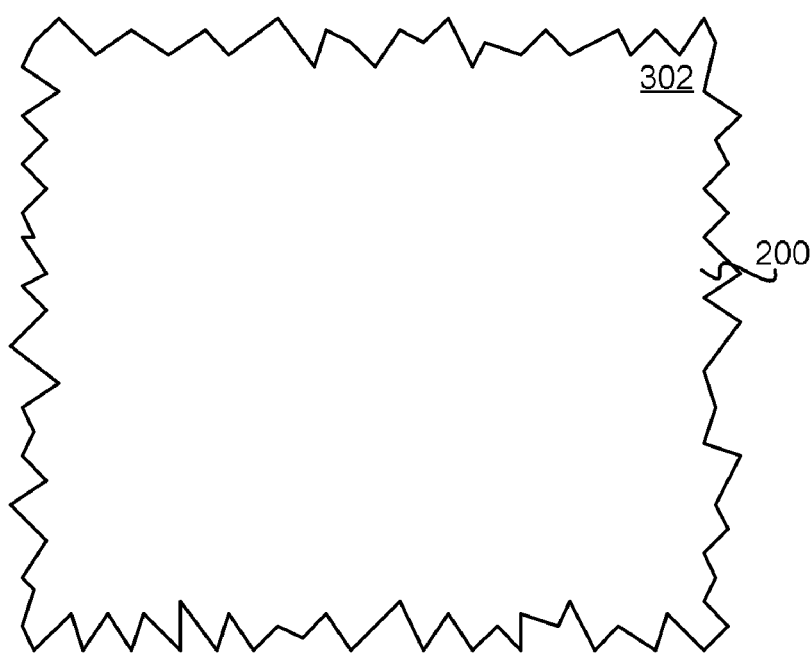

FIG. 3 shows the image data 200 in relation to which a border 302 has been applied, according to an embodiment of the invention. The border 302 is drawn around the image data 200 as the user sings or speaks. Various characteristics of this audio data can control in which direction the border 302 is drawn, and whether the border is sharp and jagged or soft and round. Alternatively, the border 302 may be drawn around the image data 200 after the user has finished speaking or singing, such that a single value of one or more characteristics of the audio data affects the shape of the border 302 around the image data 200.

As another example of border application to image data, the user may select the general shape of the border from a number of predetermined choices. Thereafter, the shape is modified based on audio data. For example, as the user speaks or sings, the pitch of this audio data may alter the shape of the border, the volume of the audio data may affect its color, and so on. In this way, standard border templates can nevertheless be easily customized by the user by using audio data. The texture of a border may also be affected by the audio data.

As another example of border application to image data, the user may again select the general shape of the border from a number of predetermined choices. Thereafter, audio data is recorded or otherwise accessed. A single value of one or more characteristics of the audio data may affect the shape of the border around the image data 200. As such, the user may be able to select what portion of the audio data is used to affect application of the border, such that as a different portion of the audio data is selected, the single value of the characteristics of the audio data in question changes, and the border changes shape, color, and so on. In this example, the same sample of audio data is used to modify the border in different ways, by having the user select different portions of the audio data.

Figure 4:
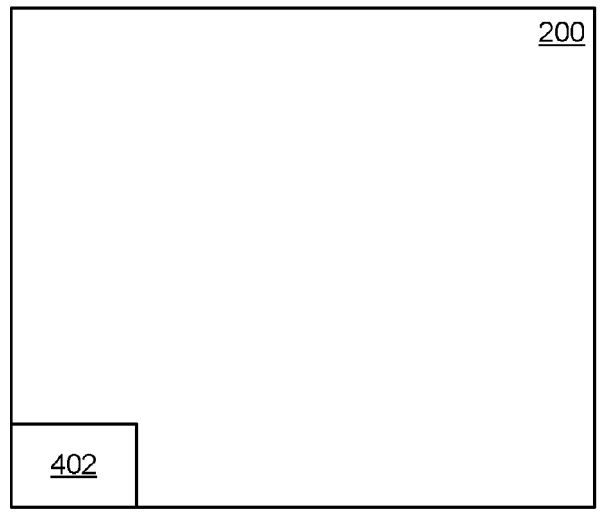

FIG. 4 shows the image data 200 in which a bottom left portion 402 thereof can change in color based on audio data, according to an embodiment of the invention. The user may be requested to speak a signature phrase in a way that is normal to the user. This signature phrase, such as the user's name, is recorded as the audio data, and based on one or more characteristics thereof, a value is determined by which the coloring of the portion 402 of the image data 200 is affected. For example, the color may be selected from the color spectrum based on the value determined.

In this way, the portion 402 acts as a sort of digital signature, or watermark, for the image data 200. Since the color of the portion 402 is dependent on the user speaking a signature phrase, the color is substantially unique to the user. Assuming that the user is able to speak this phrase in the same way (i.e., in the same tone, volume, and at the same speed, and so on) each time, the portion 402 of each different set of image data may be colored in substantially the same way. The user can thus "sign" his or her digital images based on audio data.

As another example of coloring image data based on audio data, the user may first be requested to set baseline audio data, by, for instance, singing in a normal voice. This baseline audio data is then used to interpret colors. For example, subsequently recorded audio data that has a higher pitch than the baseline audio data may color the image data in a reddish tone, whereas subsequently recorded audio data that has a lower pitch may color the image data in a more violet tone. The coloring of the image data can be applied and displayed in substantially real-time, such that the user can provide the subsequently recorded audio data and see how it affects the image data until the desired look has been achieved.

As a third example of coloring image data based on audio data, no baseline audio data may be set, but rather an absolute mapping of voice pitch to color may be set. Thus, users having lower voices may be able to achieve image data coloring that is darker than users having higher voices. The coloring of the image data may also be varied at different locations of the image data. As such, as the user speaks or sings, different locations of the image data are colored based on the pitch of the audio data at a corresponding point in time.

Those of ordinary skill within the art can appreciate that visual effects can be applied to image data in other ways than have been described in relation to the examples of FIGS. 2, 3, and 4. Any type of visual effect that has one or more parameters governing how the visual effect is applied to image data can be applied based on audio data. Thus, rather than having predetermined values for these parameters, or rather than allowing the user to explicitly select values for these parameters or using random numbers for the parameters, values of audio data characteristics are instead used to govern visual effect application to image data. As a result, more varied visual effects can be applied to image data, such that two different applications of a visual effect using different audio data may end up looking completely different.

Figure 5:
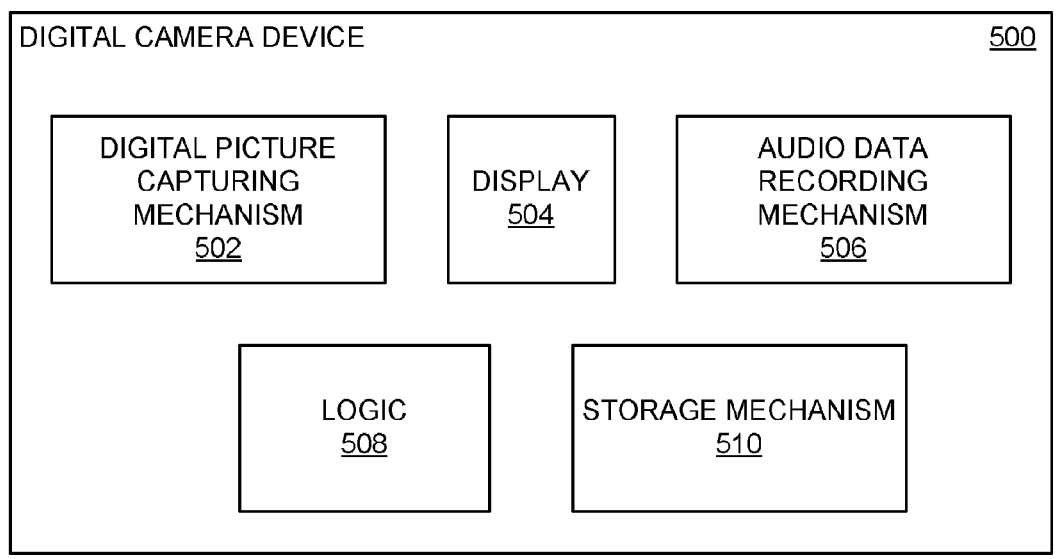
FIG. 5 is a block diagram of a digital camera device, according to an embodiment of the invention.

In conclusion, FIG. 5 shows a rudimentary digital camera device 500, according to an embodiment of the invention. The digital camera device 500 includes a digital picture capturing mechanism 502, a display 504, an audio data recording mechanism 506, logic 508, and a storage mechanism 510. As can be appreciated by those of ordinary skill within the art, the digital camera device 500 may include other components, in addition to and/or in lieu of those depicted in FIG. 5.

The digital picture capturing mechanism 502 captures digital pictures as image data. The mechanism 502 may be an optical sensor, such as a complementary metal-oxide silicon (CMOS) sensor, a charge-coupled device (CCD) sensor, or another type of mechanism that is able to capture digital pictures as image data. The display 504 displays the image data, including after which a visual affect has been applied thereto using audio data. The display 504 may be a liquid crystal display (LCD), for instance.

The audio data recording mechanism 506 records the audio data on which basic a visual effect is applied to the image data. The mechanism 506 may be a microphone, for instance. The logic 508 is that which applies a visual effect to the captured image data based on the recorded audio data. The logic 508 may be implemented in software, hardware, or a combination of software and hardware. Finally, the storage mechanism 510 stores the image data and the audio data, and may be memory, such as dynamic random-access memory (DRAM) or flash memory like static random-access memory (SRAM).

We claim:

1. A method comprising:
   accessing audio data, by a hardware device;
   applying a visual effect to image data based on the audio data, by the hardware device, the image data constituting a static digital image, the visual effect constituting a static visual effect;
   displaying the image data to which the visual effect has been applied based on the audio data, by the hardware device; and,
   replacing an original copy of the image data with a copy of the image data to which the visual effect has been applied.

2. The method of claim 1, further comprising capturing the image data.

3. The method of claim 1, wherein accessing the audio data comprises recording the audio data in substantially real time as the visual effect is applied to the image data based on the audio data and as the image data to which the visual effect has been applied is displayed.

4. The method of claim 1, wherein accessing the audio data comprises accessing prerecorded audio data stored externally from the image data.

5. The method of claim 1, wherein accessing the audio data comprises accessing prerecorded audio data stored with the image data.

6. The method of claim 1, wherein accessing the audio data comprises permitting a user to select a portion of the audio data upon which basis the visual effect is applied to the image data.

7. The method of claim 6, wherein displaying the image data to which the visual effect has been applied based on the audio data comprises displaying the image data in substantially real time as the user selects the portion of the audio data upon which basis the visual effect is applied to the image data.

8. The method of claim 1, wherein applying the visual effect to the image data based on the audio data comprises:
   mapping a characteristic of the audio data to a parameter in accordance with which the visual effect is applied to the image data, the characteristic of the audio data changing over a time span of the audio data; and,
   applying the visual effect to the image data by varying the parameter in accordance with the characteristic of the audio data as the characteristic changes over the time span of the audio data.

9. The method of claim 8, wherein the characteristic comprises one or more of:
   tone, volume, bandwidth, and pitch of the audio data.

10. The method of claim 8, wherein the parameter comprises one or more of: a degree to which the visual effect is applied to the image data, color, contrast, and brightness.

11. The method of claim 1, wherein applying the visual effect to the image data based on the audio data comprises applying one or more of a texture, a border, a digital signature, an artistic effect, a coloring to the image data based on the audio data.

12. The method of claim 1, wherein displaying the image data to which the visual effect has been applied based on the audio data comprises displaying the image data in substantially real time as the visual effect is applied to the image data based on the audio data.

13. The method of claim 1, wherein the method is performed within a digital camera device, such that the image data comprises a digital picture captured by the digital camera device, and such that the hardware device is the digital camera device.

14. The method of claim 1, wherein the static digital image is a single static digital image.

15. A digital camera device comprising:
   a digital picture capturing mechanism to capture a digital picture as image data, the image data constituting a static digital image;
   logic to apply a visual effect to the image data based on audio data, the visual effect constituting a static visual effect; and,
   a display to display the image data to which the visual effect has been applied based on the audio data,
   wherein the logic is to replace an original copy of the image data with a copy of the image data to which the visual effect has been applied.

16. The digital camera device of claim 15, further comprising an audio data recording mechanism to record the audio data on which basis the logic applies the visual effect to the image data.

17. The digital camera device of claim 15, wherein the logic is further to permit a user to select a portion of the audio data upon which basis the visual effect is applied to the image data, via a user interface.

18. The digital camera device of claim 15, wherein the logic is to apply the visual effect to the image data based on the audio data by:
   mapping a characteristic of the audio data to a parameter in accordance with which the visual effect is applied to the image data, the characteristic of the audio data changing over a time span of the audio data; and,
   applying the visual effect to the image data by varying the parameter in accordance with the characteristic of the audio data as the characteristic changes over the time span of the audio data.

19. The digital camera device of claim 15, wherein the static digital image is a single static digital image.

* * * * *